US009848385B2

(12) United States Patent
Park et al.

(10) Patent No.: US 9,848,385 B2
(45) Date of Patent: *Dec. 19, 2017

(54) APPARATUS, SYSTEM AND METHOD OF COMMUNICATING A WAKEUP PACKET

(71) Applicant: INTEL CORPORATION, Santa Clara, CA (US)

(72) Inventors: Minyoung Park, Portland, OR (US); Vallabhajosyula S. Somayazulu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,827

(22) Filed: Sep. 22, 2016

(65) Prior Publication Data

US 2017/0111866 A1    Apr. 20, 2017

Related U.S. Application Data

(63) Continuation of application No. 14/864,952, filed on Sep. 25, 2015, now Pat. No. 9,485,733.

(60) Provisional application No. 62/162,766, filed on May 17, 2015.

(51) Int. Cl.
*H04L 27/04* (2006.01)
*H04W 52/02* (2009.01)
*H04L 27/26* (2006.01)

(52) U.S. Cl.
CPC ......... *H04W 52/0235* (2013.01); *H04L 27/04* (2013.01); *H04L 27/2602* (2013.01)

(58) Field of Classification Search
CPC ..... H04L 27/04; H04L 27/06; H04W 52/0235
USPC .......................................................... 375/260
See application file for complete search history.

(56) References Cited

U.S. PATENT DOCUMENTS

| 9,485,733 B1* | 11/2016 | Park ................ H04W 52/0235 |
| 2007/0053462 A1 | 3/2007 | Pirooz et al. |
| 2014/0126442 A1 | 5/2014 | Jafarian et al. |
| 2015/0092649 A1 | 4/2015 | Wu et al. |
| 2015/0334650 A1 | 11/2015 | Park |

FOREIGN PATENT DOCUMENTS

| EP | 2680522 | 1/2014 |
| WO | 02061957 | 8/2002 |

(Continued)

OTHER PUBLICATIONS

Office Action for U.S. Appl. No. 14/864,952, dated Feb. 24, 2016, 11 pages.

(Continued)

*Primary Examiner* — Michael Neff
(74) *Attorney, Agent, or Firm* — Shichrur & Co.

(57) ABSTRACT

Some demonstrative embodiments include apparatuses, devices, systems and methods of communicating a wakeup packet. For example, an apparatus may include circuitry configured to cause a first wireless device to modulate a preamble of a wakeup packet according to an Orthogonal Frequency Division Multiplexing (OFDM) scheme; modulate a payload of the wakeup packet according to an On-Off keying (OOK) modulation scheme over a plurality of OFDM tones; and transmit the wakeup packet to a second wireless device.

24 Claims, 6 Drawing Sheets

(56) References Cited

FOREIGN PATENT DOCUMENTS

WO      2012067884      5/2012
WO      2015026803      2/2015

OTHER PUBLICATIONS

IEEE Std 802.111™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
International Search Report and Written Opinion for PCT/US2016/025142, dated Aug. 30, 2016, 13 pages.
Notice of Allowance for U.S. Appl. No. 14/864,952, dated Jun. 23, 2016, 12 pages.

\* cited by examiner

APPARATUS, SYSTEM AND METHOD OF COMMUNICATING A WAKEUP PACKET

CROSS REFERENCE

This application claims the benefit of and priority from U.S. Provisional Patent Application No. 62/162,766 entitled "Apparatus, System and Method of Communicating a Packet Including an On-Off Keying (OOK) Payload", filed May 17, 2015, the entire disclosure of which is incorporated herein by reference.

TECHNICAL FIELD

Embodiments described herein generally relate to communicating a wakeup packet.

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
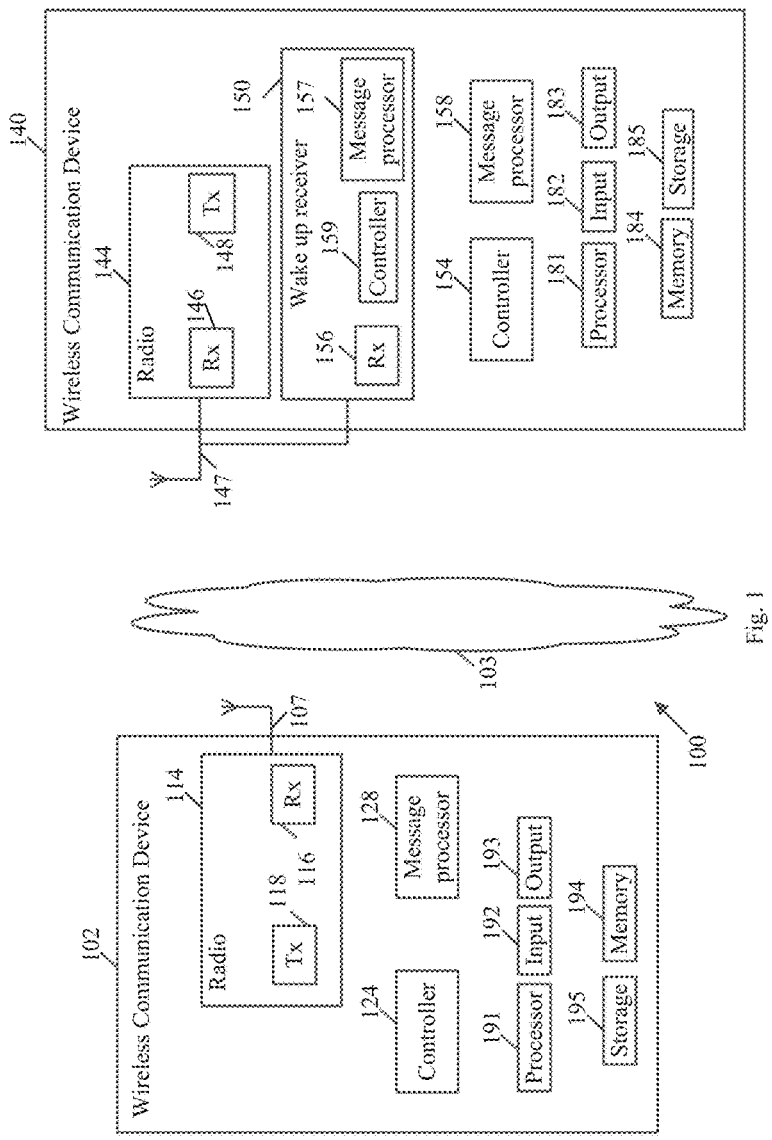
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications,* Mar. 29, 2012); IEEE802.11ac-2013 ("*IEEE P802.11 ac-2013, IEEE Standard for Information Technology—Telecommunications and Information Exchange Between Sys-* tems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcm/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); IEEE802.11-ay (P802.11ay Standard for Information Technology—Telecommunications and Information Exchange Between Systems Local and Metropolitan Area Networks—Specific Requirements Part 11: Wireless IAN Medium Access Control (MAC) and Physical Layer (PHY) Specifications—Amendment: Enhanced Throughput for Operation in License-Exempt Bands Above 45 GHz)) and/or future versions and/or derivatives thereof) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In some demonstrative embodiments, device 102 and/or device 140 may include, operate as, and/or perform the functionality of any other devices and/or STAs.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may be configured to communicate according to an OFDM scheme. For example, radios 114 and/or 144 may include an OFDM receiver and/or an OFDM transmitter. In other embodiments, radios 114 and/or 144 may be configured to communicate with any other additional or alternative modulation scheme.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140.

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wakeup receiver 150 configured to power on and/or to wakeup radio 144 of device 140.

In some demonstrative embodiments, wakeup receiver 150 may wake up radio 144, for example, based on a packet, e.g., a wakeup packet, received from another device, e.g., device 102, which is, for example, to transmit data to device 140.

In some demonstrative embodiments, wakeup receiver 150 may include a receiver 156 configured to receive the wakeup packet.

In some demonstrative embodiments, wakeup receiver 150 may include circuitry and/or logic configured to receive, decode, demodulate, and/or process the wakeup packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wakeup receiver 150 may include a controller 159 configured to control one or more operations and/or functionalities of wakeup receiver 150, e.g., for processing the wakeup packet and/or waking up radio 144. For example, controller 159 may be configured to control a power supply of radio 144, and/or any other mechanism to wakeup radio 144, e.g., upon determining that a wakeup packet has been received by wakeup receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wakeup receiver 150 may include a message processor 157 configured to process and/or access one or messages communicated by wakeup receiver 150.

In some demonstrative embodiments, message processor 157 may be configured to process one or more wakeup packets received by wakeup receiver 150, and/or to indicate to controller 159 that a wakeup packet is received.

In one example, message processor 157 may be configured to access, process, demodulate and/or decode reception of the wakeup packets by a wireless station, e.g., a wireless STA implemented by device 140.

In some demonstrative embodiments, message processor 157 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 157. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wakeup receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a System on Chip (SoC). In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wakeup receiver 150, message processor 158, controller 154, and/or radio 144 may be implemented as part of the chip or SoC.

In other embodiments, radio 144, wakeup receiver 150, controller 154 and/or message processor 158 may be implemented by one or more additional or alternative elements of device 140.

In some demonstrative embodiments, wakeup receiver 150 may be associated with one or more of antennas 147, e.g., which may be shared with radio 144.

In other embodiments, wakeup receiver 150 may include, or may be associated with, another, e.g., separate, antenna.

In some demonstrative embodiments, wakeup receiver 150 may be configured to wake up radio 144, for example, if device 140 has data to transmit, and/or if data is to be received by radio 144.

In one example, wakeup receiver 150 may be configured to implement a low-power wakeup receiver (LP-WUR) scheme, for example, to wakeup radio 144, e.g., only when device 140 is to receive data and/or to transmit data.

In some demonstrative embodiments, wakeup receiver 150 may have, for example, a relatively low power consumption, e.g., less than 100 microwatts. Accordingly, the power consumption of device 140 may be reduced for example, during times when there is no data to be received at device 140 and only wakeup receiver 150 is on.

In some demonstrative embodiments, wakeup receiver 150 may wake up radio 144, for example, based on a wakeup packet received from device 102.

In one example, receiver 156 may be configured to receive the wakeup packet from device 102, message processor 156 may be configured to process the wakeup packet, and/or controller 159 may be configured to wake up radio 144.

In some demonstrative embodiments, device 140 may be configured to transmit the wakeup packet to device 102, for example, to indicate to wakeup receiver 150 that the radio 144 is to be woken up, e.g., to receive data from device 102.

In some demonstrative embodiments, controller 159 may be configured to cause radio 144 to wake up, e.g., to switch to an active mode, for example, to receive data from device 102, e.g., subsequent to receiving the wakeup packet from device 102.

In some demonstrative embodiments, controller 159 may be configured to cause, control and/or trigger radio 144 to wake up, e.g., to switch to an active mode, for example, to transmit data to device 102 and/or to another device.

In some demonstrative embodiments, device 102 and/or device 140 may be configured to communicate the wakeup packet, for example, in compliance with one or more wireless communication standards and/or protocols.

In some demonstrative embodiments, device 102 and/or device 140 may be configured to communicate the wakeup packet, for example, in compliance with one or more existing wireless communication standards and/or protocols ("legacy standards"), for example, in compliance with one or more IEEE 802.11 standards.

In some demonstrative embodiments, the wakeup packet may include a preamble ("legacy preamble") in compliance with one or more legacy standards.

In some demonstrative embodiments, the wakeup packet may include a preamble in compliance with one or more legacy standards, for example, to enable one or more legacy devices to decode and/or process the preamble.

In some demonstrative embodiments, the wakeup packet may include a payload, e.g., following the legacy preamble.

In some demonstrative embodiments, the payload may be modulated by a simple modulation scheme, for example, an On-Off Keying (OOK) modulation scheme.

Some demonstrative embodiments are described herein with respect to an OOK modulation scheme. However, in other embodiments the wakeup packet may include a payload modulated according to any other Amplitude-Shift Keying (ASK) modulation scheme, a Frequency Shift Keying (FSK) modulation scheme, and/or any other modulation scheme.

In some demonstrative embodiments, using a dedicated OOK transmitter to modulate the payload may not be efficient.

In one example, it may not be efficient and/or advantageous to generate the wakeup packet using a separate wakeup packet transmitter with an OOK modulator. For example, in such implementation a device ("transmitter device"), transmitting the wakeup packet, e.g., device 102, may be required to have two separate transmit modules, for example, a first transmit module, for example, an OFDM transmitter, e.g., radio 114, in compliance with the IEEE 802.11 standards, and a second transmitter, e.g., an OOK transmitter, to transmit the payload of the wakeup packet.

In some demonstrative embodiments, the transmitter device, e.g., device 102, may be configured to generate a wakeup packet, for example, by reusing an OFDM transmitter, e.g., a transmitter in compliance with the IEEE 802.11 standards.

In some demonstrative embodiments, the transmitter device, e.g., device 102, may be configured to use the same transmitter, for example, an OFDM transmitter, e.g., radio 114, for example, to generate the wakeup packet including both the legacy preamble, which may be modulated using the OFDM modulation scheme, and the payload, e.g., which may be modulated using the OOK modulation scheme.

In some demonstrative embodiments, the transmitter device, e.g., device 102, may be configured to generate a wakeup packet, for example, without needing to use a dedicated transmit module, e.g., a dedicated OOK transmit module.

In some demonstrative embodiments, device 102, may be configured to use transmitter 118 of radio 114, for example, to generate the wakeup packet including both the legacy preamble and the wakeup payload, for example, without needing to use two separate transmit modules, e.g., as described below.

In some demonstrative embodiments, device 102 and/or device 140 may be configured to communicate a wakeup packet using a wakeup radio pulse design, which may be, for example, uniquely enabled by the re-use of the OFDM transmitter, e.g., as described below.

In some demonstrative embodiments, device 102 may generate a wakeup packet including a preamble and a payload.

In one example, controller 124 may cause, trigger and/or control message generator 128 to generate the wakeup packet.

In some demonstrative embodiments, controller 124 may be configured to cause, control, and/or trigger radio 114 to modulate the preamble of the wakeup packet according to an Orthogonal Frequency Division Multiplexing (OFDM) scheme, e.g., as described below.

In some demonstrative embodiments, controller 124 may be configured to cause, control, and/or trigger radio 114 to modulate the payload of the wakeup packet according to the OOK modulation scheme over a plurality of OFDM tones of the OFDM scheme, e.g., as described below.

In some demonstrative embodiments, radio 114 may transmit the wakeup packet to device 140.

In some demonstrative embodiments, wakeup receiver 150 may receive the wakeup packet.

In some demonstrative embodiments, wakeup receiver 150 may be configured to demodulate the preamble of the wakeup packet from device 102 according to the OFDM scheme.

In some demonstrative embodiments, wakeup receiver 150 may be configured to demodulate the payload of the wakeup packet according to the OOK modulation scheme over the plurality of the OFDM tones of the OFDM scheme.

In some demonstrative embodiments, wakeup receiver 150 may be configured activate radio 154 of device 140, for example, based on the payload of the wakeup packet, e.g., as described below.

In some demonstrative embodiments, the payload of the wakeup packet may include a plurality of payload values, for example, a predefined sequence of values, which may be configured to indicate that the packet is a wakeup packet, e.g., as described below with reference to FIG. 2. For example, wakeup receiver 150 may be configured to decode the payload of a received packet, and to determine that the received packet is a wakeup packet, for example, if the payload include the predefined sequence of values.

In some demonstrative embodiments, controller 124 and/or message processor 128 may be configured to set a signal field in the preamble to indicate at least a duration of the payload.

In some demonstrative embodiments, controller 124 and/or message processor 128 may be configured to set a rate field and a length field in the signal field, for example, based on a number of the plurality of OFDM tones, and a number of OOK bits in the payload, e.g., as described below with reference to FIG. 2.

Figure 2:
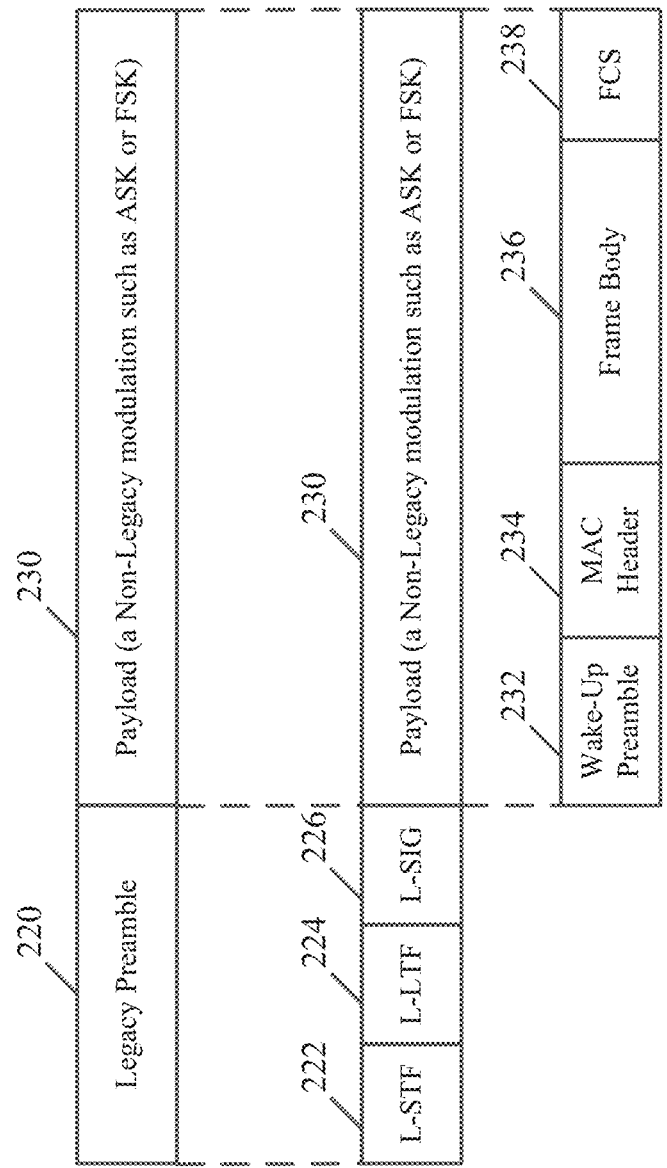
FIG. 2 is a schematic illustration of a wakeup packet, in accordance with some demonstrative embodiments.

Reference is made to FIG. 2, which schematically illustrates a wakeup packet 200, in accordance with some demonstrative embodiments.

In one example, device 102 (FIG. 1) may transmit wakeup packet 200 to device 140 (FIG. 1), for example, to indicate to wakeup receiver 150 (FIG. 1) that radio 144 (FIG. 1) is to be woken up.

In some demonstrative embodiments, message processor 128 (FIG. 1), may be configured to construct and/or generate wakeup packet 200.

As shown in FIG. 2, wakeup packet 200 may include a preamble 220 ("Legacy Preamble") and a payload 230.

In some demonstrative embodiments, preamble 220 may include, for example, a preamble construction in compliance with an IEEE 802.11 standard ("Legacy 802.11 preamble construction").

As shown in FIG. 2, preamble 220 may include a legacy short training field (L-STF) 222, for example, based on the IEEE 802.11-2012 standard, e.g., according to section 18.3.3 (PLCP preamble), and/or in accordance with any other section and/or of any other Standard.

As shown in FIG. 2, preamble 220 may include a legacy long training field (L-LTF) 224, for example, based on the IEEE 802.11-2012 standard, e.g., according to section 18.3.3 (PLCP preamble), and/or in accordance with any other section and/or of any other Standard.

As shown in FIG. 2, preamble 220 may include a signal field (L-SIG) 226, for example, based on the IEEE 802.11-2012 standard, e.g., according to section 18.3.4 (SIGNAL field), and/or in accordance with any other section and/or of any other Standard.

In some demonstrative embodiments, signal field 226 may include, for example, a rate field and/or a length field, for example, to indicate at least a duration of payload 230.

In some demonstrative embodiments, message processor 128 (FIG. 1) may be configured to set the rate field and the length field in signal field 226, for example, based on a number of the plurality of OFDM tones, and a number of OOK bits in payload 230.

In some demonstrative embodiments, the rate field and/or the length field may be set to values that indicate a longer time than an actual length of payload 230, for example, to protect a response packet, which may follow wakeup packet 200.

As shown in FIG. 2, payload 230 may include a wakeup preamble field 232, a Media Access Control (MAC) header field 234, a Frame body 236, and/or a Frame Check Sequence (FCS) field 238. In other embodiments, payload 230 may include any other additional or alternative fields.

Referring back to FIG. 1, in some demonstrative embodiments device 102 may be configured to generate a payload of a wakeup packet, e.g., payload 230 (FIG. 2), for example, according to an OOK transmit pulse design, e.g., as described below.

In some demonstrative embodiments, controller 124 may cause, trigger and/or control radio 114 to generate an OOK transmit pulse over the plurality of OFDM tones.

In some demonstrative embodiments, the plurality of OFDM tones may include 12 OFDM tones.

In other embodiments, the plurality of OFDM tones may include any other number of OFDM tones, e.g., greater than or less than 12 OFDM tones.

In some demonstrative embodiments, message processor 128 may construct the OOK transmit pulse, for example, to provide improved performance of a wakeup radio link.

In some demonstrative embodiments, message processor 128 may construct the OOK transmit pulse using the plurality of OFDM tones, e.g., as described below.

In some demonstrative embodiments, a plurality of OFDM tones, including a number, denoted n, of a total number, denoted m, of OFDM tones, wherein n<=m, may be used, for example, to construct the OOK transmit pulse, e.g., as described below with reference to FIGS. 3 and/or 4.

Figure 3:
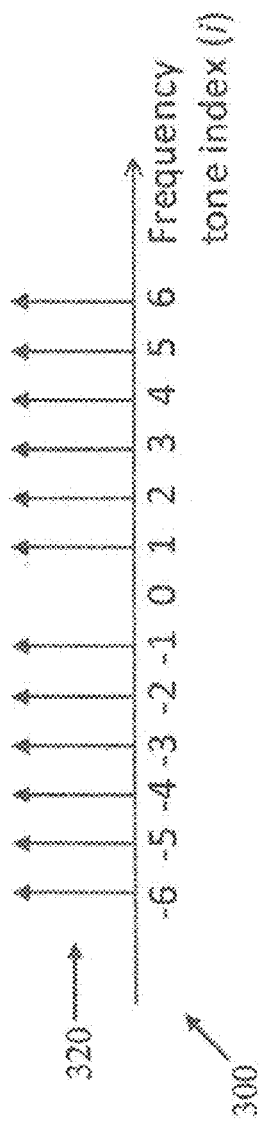
FIG. 3 is a schematic illustration of a plurality of Orthogonal-Frequency-Division Multiplexing (OFDM) tones of an On-Off Keying (OOK) transmit pulse, in accordance with some demonstrative embodiments.

Reference is made to FIG. 3, which schematically illustrates a plurality of OFDM tones 320 of an OOK transmit pulse 300, in accordance with some demonstrative embodiments.

In one example, controller 124 (FIG. 1) may cause radio 114 (FIG. 1) to generate the OOK transmit pulse 300 over the plurality of OFDM tones 320.

As shown in FIG. 3, the plurality of OFDM tones 320 may include n tones, e.g., n=12, of a total number of m OFDM tones, e.g., m=64, for example, for a 20 Megahertz (MHz) channel According to this example, a wakeup signal bandwidth may be, for example, 4.06 MHz.

For example, as shown in FIG. 3, the plurality of OFDM tones 320 may include 12 tones centered on a central tone, e.g., a Direct Current (DC) tone, denoted "0". For example, the plurality of OFDM tones 320 may include six tones, denoted "−6", "−5", "−4", "−3", "−2", and "4", on one side of the DC tone; and six tones, denoted "1", "2", "3", "4", "5", and "6", on another side of the DC tone.

In other embodiments, any other number of tones, and/or any other arrangement of tones may be used.

In some demonstrative embodiments, the OOK transmit pulse 300 may include, for example, the number n, e.g., n=12, of subcarriers, which may be modulated, for example, by elements of a predefined sequence, denoted S.

In some demonstrative embodiments, the sequence S may include, for example, the following sequence:

$S_{-26,26}$=sqrt(13/6)*{0,0,0,0, 0,0,0,0, 0,0,0,0, 0,0,0,0, 0,0, 0,0, 1+j, −1−j, 1+j, −1−j, −1−j, 1+j, 0, −1−j, −1−j, 1+j, 1+j, 1+j, 1+j, 0,0,0,0, 0,0,0,0, 0,0,0,0, 0,0,0,0, 0,0,0,0}

In other embodiments, any other sequence may be used.

In some demonstrative embodiments, controller 124 (FIG. 1) may be configured to cause, control, and/or trigger radio 114 (FIG. 1) to generate the OOK transmit pulse 300, for example, using a transmit signal generation scheme of OFDM signals.

In one example, the OOK transmit pulse may be generated, for example, in compliance with the IEEE 802.11-2012 standard, e.g., followed by a 0.8 usec cyclic prefix extension.

Figure 4:
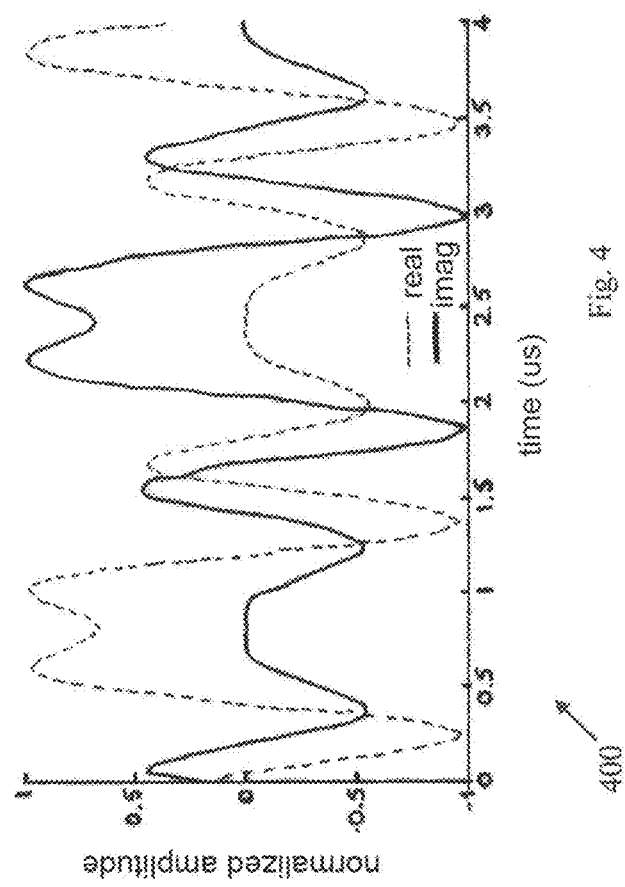
FIG. 4 is a schematic illustration of an OOK transmit pulse, in accordance with some demonstrative embodiments.

Reference is made to FIG. 4, which schematically illustrates an OOK transmit pulse 400, in accordance with some demonstrative embodiments.

In one example, controller 124 (FIG. 1) may be configured to cause, control, and/or trigger radio 114 (FIG. 1) to generate OOK transmit pulse 400, for example, over the plurality of frequency tones 320 (FIG. 3), e.g., as described above.

Referring back to FIG. 1, in some demonstrative embodiments, controller 124 may be configured to cause, control, and/or trigger radio 114 to modulate a plurality of payload values of the wakeup payload by selectively transmitting an OOK transmit pulse, e.g., OOK transmit pulse 400 (FIG. 4), during one or more OFDM symbol periods of a plurality of OFDM symbol periods, e.g., as described below.

In some demonstrative embodiments, controller 124 may be configured to cause and/or trigger radio 114 to select whether or not to transmit the OOK transmit pulse over at least one OFDM symbol period, for example, based on a payload value.

In some demonstrative embodiments, controller 124 may be configured to cause and/or trigger radio 114 to select to transmit the OOK transmit pulse over the OFDM symbol period to indicate an on state of the OOK modulation scheme. For example, controller 124 may select to cause and/or trigger radio 114 to transmit the OOK transmit pulse over the OFDM symbol period, for example, if the payload value is "1".

In one example, controller 124 may be configured to cause, control, and/or trigger radio 114 to transmit a first value, e.g., a value of '1', in the payload field, for example, by transmitting the OOK transmit pulse, e.g., during one OFDM symbol period.

In some demonstrative embodiments, controller 124 may be configured to cause, control, and/or trigger radio 114 to select not to transmit the OOK transmit pulse over the OFDM symbol period to indicate an off state of the OOK modulation scheme. For example, controller 124 may select not to cause radio 114 to transmit the OOK transmit pulse over the OFDM symbol period, for example, if the payload value is "0".

In one example, controller 124 may be configured to cause, control and/or trigger radio 114 to transmit a second value, e.g., a value of '0', in the payload field, for example, by selecting not to transmit the OOK transmit pulse, e.g., during one OFDM symbol period.

In some demonstrative embodiments, a simple r repetition coding, e.g., an 1/r code rate, may be achieved, for example, by transmitting the OOK transmit pulses during r OFDM symbol periods, e.g., to transmit a value of '1'; and/or by not transmitting the OOK transmit pulse during r OFDM symbol periods, e.g., to transmit the value of '0'.

In some demonstrative embodiments, wakeup receiver 150 may receive the wakeup packet including the payload modulated according to the OOK scheme.

In some demonstrative embodiments, wakeup receiver 150 may be configured to demodulate the plurality of payload values of the payload of the wakeup packet received from device 102, for example, by detecting which OFDM symbol periods of the plurality of OFDM symbol periods include an OOK transmit pulse over the plurality of OFDM tones.

In some demonstrative embodiments, wakeup receiver 150 may be configured to determine a first OOK value of a payload value corresponding to at least one OFDM symbol period, for example, when the OOK transmit pulse is received during the OFDM symbol period. For example, wakeup receiver 150 may determine an "on" state of the OOK modulation scheme, representing a first payload value, e.g., "1", corresponding to at least one OFDM symbol period, for example, if the OOK transmit pulse is received during the OFDM symbol period.

In some demonstrative embodiments, wakeup receiver 150 may be configured to determine a second OOK value of a payload value corresponding to at least one OFDM symbol period, for example, when the OOK transmit pulse is not received during the OFDM symbol period. For example, wakeup receiver 150 may determine an "off" state of the OOK modulation scheme, representing a second payload value, e.g., "0", corresponding to at least one OFDM symbol period, for example, if the OOK transmit pulse is not received during the OFDM symbol period.

In one example, wakeup receiver 150 may be configured to process the payload of the wakeup packet from device 102, for example, by determining a value of '1', e.g., with respect to a received OFDM symbol including the OOK transmit pulse; and/or determining a value of '0', e.g., with respect to a received OFDM symbol not including the OOK transmit pulse.

Figure 5:
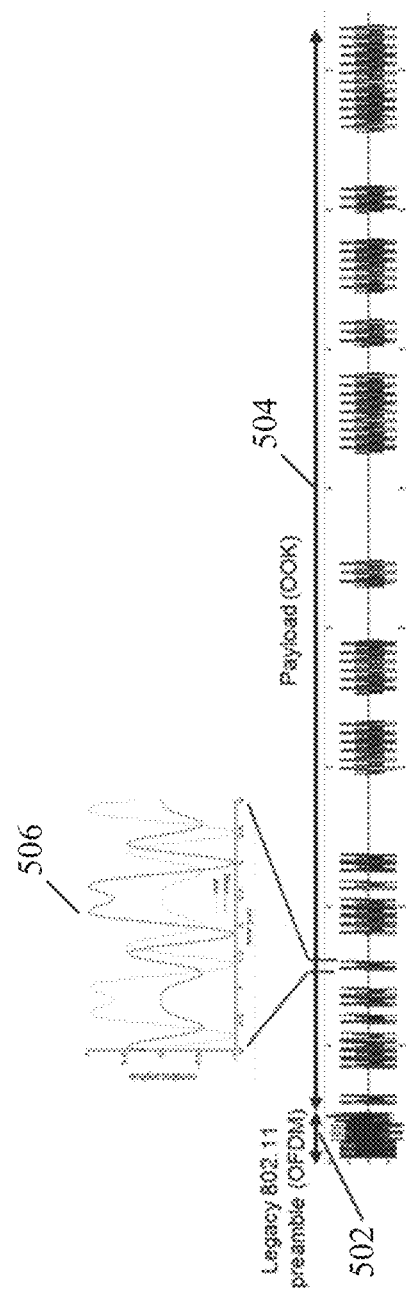
FIG. 5 is a schematic illustration of a wakeup packet transmission, in accordance with some demonstrative embodiments.

Reference is made to FIG. 5, which schematically illustrates a transmission of a wakeup packet 500, in accordance with some demonstrative embodiments.

In one example, device 102 (FIG. 1) may transmit wakeup packet 500 to device 140 (FIG. 1), for example, to indicate to wakeup receiver 150 (FIG. 1) that radio 144 (FIG. 1) is to be woken up.

As shown in FIG. 5, wakeup packet 500 may include a legacy preamble 502 followed by a payload 504.

In some demonstrative embodiments, legacy preamble 502 may be modulated according to an OFDM modulation, e.g., as described above.

In some demonstrative embodiments, payload 504 may be modulated according to the OOK modulation scheme over a plurality of OFDM tones, e.g., as described above.

As shown in FIG. 5, payload 504 may include an OOK transmit pulse 506, e.g., OOK transmit pulse 400 (FIG. 4).

Referring back to FIG. 1, a design of an OOK transmit pulse, e.g., OOK transmit pulse 400 (FIG. 4), of a wake up packet, e.g., wakeup packet 500 (FIG. 5), may be configured, for example, to provide improved performance of a wakeup scheme.

In some demonstrative embodiments, designing a wakeup radio receiver, e.g., wakeup receiver 150, for example, to meet extremely low power targets may lead to some performance losses, e.g., due to frequency offsets and/or interference.

In some demonstrative embodiments, the design of the OOK transmit pulse may be configured, for example, to reduce and/or mitigate the performance loss, for example, by using frequency domain information and/or hardware (HW) of an OFDM transmitter, e.g., transmitter 118.

In some demonstrative embodiments, controller 154 may be configured to determine and/or adjust the subcarriers of the OOK transmit pulse, e.g., the plurality of OFDM tones 320 (FIG. 3).

In some demonstrative embodiments, controller 154 may be configured to adjust and/or to adapt a number of the subcarriers, a location (index) of non-zero subcarriers, and/or a modulation on the subcarriers.

In some demonstrative embodiments, a sender of the wakeup transmit pulse, e.g., device 102, and/or a receiver of the wakeup packet, e.g., device 140, may be configured to perform interference and/or frequency offset measurements on the received wakeup signal, e.g., periodically, for example, as described below.

In some demonstrative embodiments, controller 154 may be configured to cause device 140 to transmit to device 102 feedback information configured to trigger an adjustment of the OOK modulation scheme over the plurality of OFDM tones.

In some demonstrative embodiments, the feedback information may include a frequency offset of the plurality of OFDM tones, and/or an interference to the plurality of OFDM tones, and/or information of one or more additional or alternative attributes.

In some demonstrative embodiments, transmitter 148 may transmit the feedback information to device 102.

In one example, controller 159 may control, cause and/or trigger message generator 157 to generate a feedback message including the feedback information, and controller 159 and/or controller 154 may control, cause and/or trigger transmitter 148 to transmit the feedback message to device 102.

In some demonstrative embodiments, device 102 may receive the feedback message.

In some demonstrative embodiments, controller 124 may be configured to select the plurality of OFDM tones to be used for modulating the wakeup packet, for example, based at least on the feedback information from device 140.

In some demonstrative embodiments, controller 124 may be configured to adjust a modulation of the plurality of OFDM tones, e.g., based at least on the feedback from device 140.

In one example, wakeup receiver 150 may feedback to radio 114, e.g., via radio 144, information indicating a frequency offset of the plurality of frequency tones 320 (FIG. 3). For example, the frequency offset may be of +200 kHz.

According to this example, controller 124 may be configured to adapt the OOK transmit pulse in the frequency domain, for example, to compensate for the frequency offset of the plurality of frequency tones 320 (FIG. 3), e.g., the frequency offset of +200 kHz.

For example, controller 124 may be configured to shift the plurality of frequency tones 320 (FIG. 3) of the OOK transmit pulse 400 (FIG. 4) by one index to the left, for example, if a subcarrier width is 312.5 kHz, e.g., according to an IEEE 802.11-2012 standard. Accordingly, a resulting down converted signal at wakeup receiver 150 may be closer to being centered at the Direct Current (DC), for example, to reduce a Signal to Noise Ratio (SNR) loss, e.g., due to filtering and the like.

In another example, controller 124 may be configured to modify the amplitudes of the plurality of frequency tones 320 (FIG. 3) of the OOK transmit pulse 400 (FIG. 4), for example, based at least on interference measurements fed back from wakeup receiver 150. For example, controller 124 may be configured to modify the amplitudes of the plurality of frequency tones 320 (FIG. 3), for example, to maximize an SNR at the output of a possible pulse matched filter, for example, at wakeup receiver 150, e.g., to boost signal power at frequencies with lower interference.

In some demonstrative embodiments, adapting the design of the OOK transmit pulse in the frequency domain may be a valuable option, for example, at least for improving system performance.

In some demonstrative embodiments, using radio 114 to transmit the wakeup packet, for example, without using a dedicated OOK transmitter at device 102, may enable implementation of a wakeup scheme in a flexible and/or easy manner.

Figure 6:
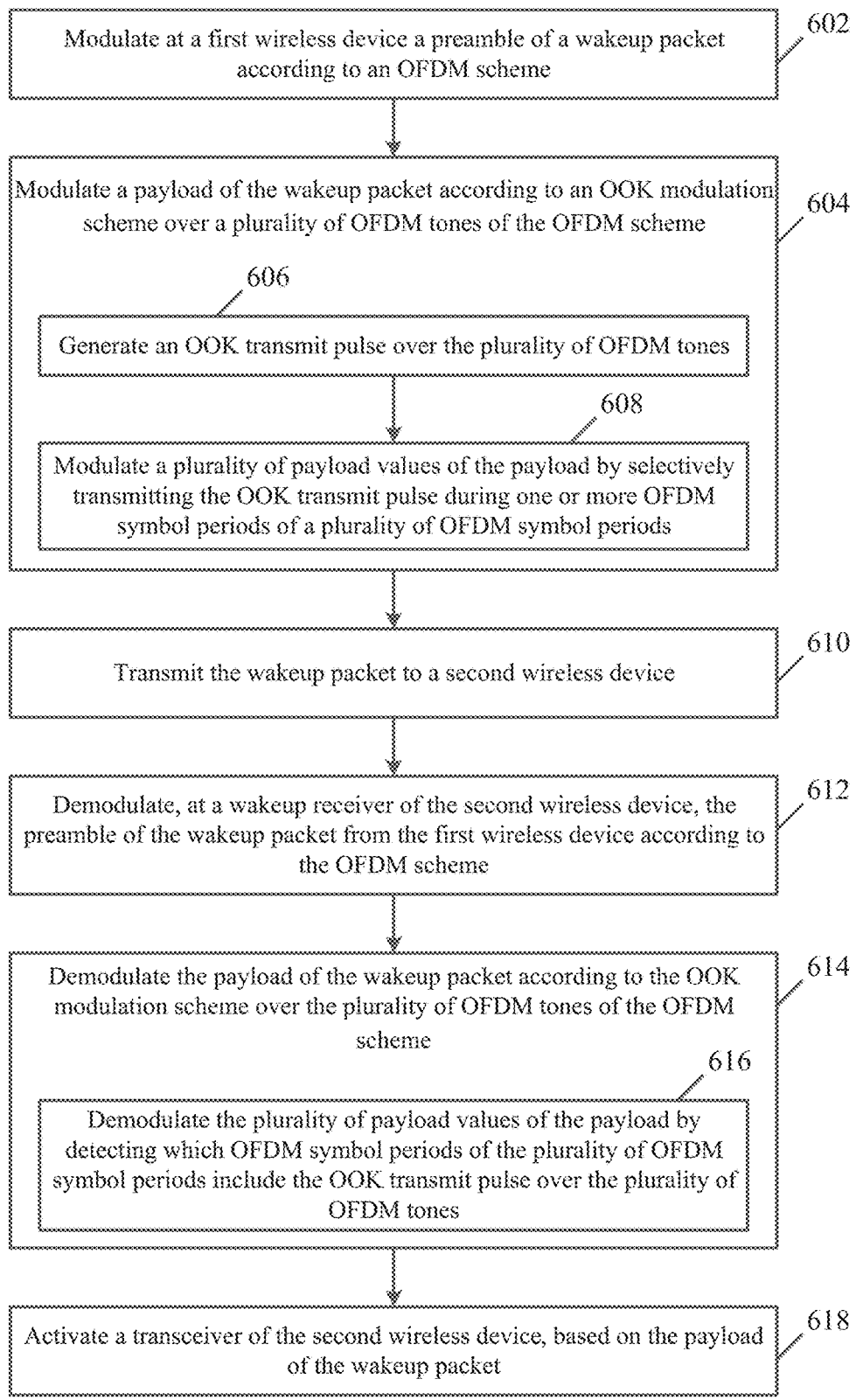
FIG. 6 is a schematic flow-chart illustration of a method of communicating a wakeup packet, in accordance with some demonstrative embodiments.

Reference is made to FIG. 6, which schematically illustrates a method of communicating a wakeup packet, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), a controller, e.g., controller 159 (FIG. 1), controller 124 (FIG. 1) and/or controller 154 (FIG. 1), a radio, e.g., radio 114 (FIG. 1) and/or radio 144 (FIG. 1), a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 602, the method may include modulating at a first device a preamble of a wakeup packet according to an OFDM scheme. For example, device 102 (FIG. 1) may modulate preamble 220 (FIG. 2) of wakeup packet 220 (FIG. 2) according to the OFDM scheme, e.g., as described above.

As indicated at block 604, the method may include modulating a payload of the wakeup packet according to an OOK modulation scheme over a plurality of OFDM tones of the OFDM scheme. For example, device 102 (FIG. 1) may modulate the payload 230 (FIG. 2) of the wakeup packet 200 (FIG. 2) according to the OOK modulation scheme over the plurality of OFDM tones of the OFDM scheme, e.g., as described above.

As indicated at block 606, modulating the payload of the wakeup packet may include generating an OOK transmit pulse over the plurality of OFDM tones. For example, device 102 (FIG. 1) may generate the OOK transmit pulse 400 (FIG. 4) over the plurality of OFDM tones, e.g., as described above.

As indicated at block 608, modulating the payload of the wakeup packet may include modulating a plurality of payload values of the payload by selectively transmitting the OOK transmit pulse during one or more OFDM symbol periods of a plurality of OFDM symbol periods. For example, device 102 (FIG. 1) may modulate the payload 230 (FIG. 2) by modulating the plurality of payload values of the payload by selectively transmitting the OOK transmit pulse 400 (FIG. 4) during the one or more OFDM symbol periods of the plurality of OFDM symbol periods, e.g., as described above.

As indicated at block 610, the method may include transmitting the wakeup packet to a second wireless device. For example, device 102 (FIG. 1) may transmit the wakeup packet to device 140 (FIG. 1), e.g., as described above.

As indicated at block 612, the method may include demodulating, at a wakeup receiver of the second wireless device, a preamble of the wakeup packet from the first wireless device according to an OFDM scheme. For example, wakeup receiver 150 (FIG. 1) may demodulate preamble 220 (FIG. 2) of the wakeup packet from the first wireless device according to the OFDM scheme, e.g., as described above.

As indicated at block 614, the method may include demodulating the payload of the wakeup packet according to OOK modulation scheme over the plurality of OFDM tones of the OFDM scheme. For example, wakeup receiver 150 (FIG. 1) may demodulate the payload 230 (FIG. 2) of the wakeup packet according to the OOK modulation scheme over the plurality of OFDM tones 320 (FIG. 3), e.g., as described above.

As indicated at block 616, demodulating the payload of the wakeup packet may include demodulating the plurality of payload values of the payload by detecting which OFDM symbol periods of the plurality of OFDM symbol periods include an OOK transmit pulse over the plurality of OFDM tones. For example, wakeup receiver 150 (FIG. 1) may demodulate the payload of the wakeup packet by detecting which OFDM symbol periods of the plurality of OFDM symbol periods include OOK transmit pulse 400 (FIG. 4), e.g., as described above.

As indicated at block 618, the method may include activating a transceiver of the second wireless device based on the payload of the wakeup packet. For example, wakeup receiver 150 (FIG. 1) may activate radio 144 (FIG. 1), for example, based on the payload 230 (FIG. 2) of the wakeup packet 200 (FIG. 2), e.g., as described above.

Figure 7:
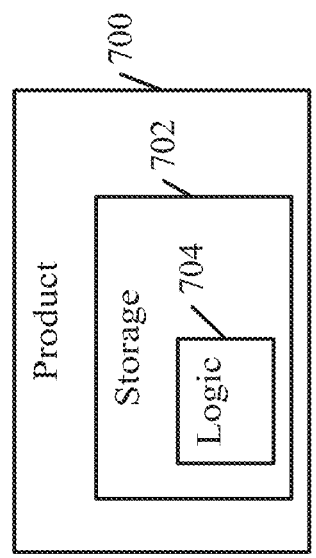
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), device 140 (FIG. 1), radio 114 (FIG. 1), radio 144 (FIG. 1), wakeup receiver 150 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), message processor 128 (FIG. 1), and/or message processor 158 (FIG. 1), and/or to perform one or more operations of the method of FIG. 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a first wireless device to modulate a preamble of a wakeup packet according to an Orthogonal Frequency Division Multiplexing (OFDM) scheme; modulate a payload of the wakeup packet according to an On-Off keying (OOK) modulation scheme over a plurality of OFDM tones of the OFDM scheme; and transmit the wakeup packet to a second wireless device.

Example 2 includes the subject matter of Example 1, and optionally, wherein the apparatus is configured to cause the first wireless device to generate an OOK transmit pulse over the plurality of OFDM tones, and to modulate a plurality of payload values of the payload by selectively transmitting the OOK transmit pulse during one or more OFDM symbol periods of a plurality of OFDM symbol periods.

Example 3 includes the subject matter of Example 2, and optionally, wherein the apparatus is configured to cause the first wireless device to select, based on a payload value, whether or not to transmit the OOK transmit pulse over at least one OFDM symbol period.

Example 4 includes the subject matter of Example 3, and optionally, wherein the apparatus is configured to cause the first wireless device to select to transmit the OOK transmit pulse over the OFDM symbol period to indicate an On-state of the OOK modulation scheme, and to select not to transmit the OOK transmit pulse over the OFDM symbol period to indicate an Off-state of the OOK modulation scheme.

Example 5 includes the subject matter of any one of Examples 1-4, and optionally, wherein the apparatus is configured to cause the first wireless device to select the plurality of OFDM tones based on a feedback from the second wireless device.

Example 6 includes the subject matter of any one of Examples 1-5, and optionally, wherein the apparatus is configured to cause the first wireless device to adjust a modulation of the plurality of OFDM tones based on a feedback from the second wireless device.

Example 7 includes the subject matter of any one of Examples 1-6, and optionally, wherein the apparatus is configured to cause the first wireless device to set a signal field in the preamble to indicate at least a duration of the payload.

Example 8 includes the subject matter of Example 7, and optionally, wherein the apparatus is configured to cause the first wireless device to set a rate field and a length field in the signal field based on a number of the plurality of OFDM tones, and a number of OOK bits in the payload.

Example 9 includes the subject matter of any one of Examples 1-8, and optionally, wherein the plurality of OFDM tones comprises 12 OFDM tones.

Example 10 includes the subject matter of any one of Examples 1-9, and optionally, comprising a transmitter configured to transmit the wakeup packet.

Example 11 includes the subject matter of any one of Examples 1-10, and optionally, comprising one or more antennas, and a memory.

Example 12 includes a system of wireless communication comprising a first wireless device, the first wireless device comprising one or more antennas; a memory; a processor; and a radio configured to modulate a preamble of a wakeup packet according to an Orthogonal Frequency Division Multiplexing (OFDM) scheme, to modulate a payload of the wakeup packet according to an On-Off keying (OOK) modulation scheme over a plurality of OFDM tones of the OFDM scheme, and to transmit the wakeup packet to a second wireless device.

Example 13 includes the subject matter of Example 12, and optionally, wherein the first wireless device is to generate an OOK transmit pulse over the plurality of OFDM tones, and to modulate a plurality of payload values of the payload by selectively transmitting the OOK transmit pulse during one or more OFDM symbol periods of a plurality of OFDM symbol periods.

Example 14 includes the subject matter of Example 13, and optionally, wherein the first wireless device is to select, based on a payload value, whether or not to transmit the OOK transmit pulse over at least one OFDM symbol period.

Example 15 includes the subject matter of Example 14, and optionally, wherein the first wireless device is to select to transmit the OOK transmit pulse over the OFDM symbol period to indicate an On-state of the OOK modulation scheme, and to select not to transmit the OOK transmit pulse over the OFDM symbol period to indicate an Off-state of the OOK modulation scheme.

Example 16 includes the subject matter of any one of Examples 12-15, and optionally, wherein the first wireless device is to select the plurality of OFDM tones based on a feedback from the second wireless device.

Example 17 includes the subject matter of any one of Examples 12-16, and optionally, wherein the first wireless device is to adjust a modulation of the plurality of OFDM tones based on a feedback from the second wireless device.

Example 18 includes the subject matter of any one of Examples 12-17, and optionally, wherein the first wireless device is to set a signal field in the preamble to indicate at least a duration of the payload.

Example 19 includes the subject matter of Example 18, and optionally, wherein the first wireless device is to set a rate field and a length field in the signal field based on a number of the plurality of OFDM tones, and a number of OOK bits in the payload.

Example 20 includes the subject matter of any one of Examples 12-19, and optionally, wherein the plurality of OFDM tones comprises 12 OFDM tones.

Example 21 includes a method to be performed by a first wireless device, the method comprising modulating a preamble of a wakeup packet according to an Orthogonal Frequency Division Multiplexing (OFDM) scheme; modulating a payload of the wakeup packet according to an On-Off keying (OOK) modulation scheme over a plurality of OFDM tones of the OFDM scheme; and transmitting the wakeup packet to a second wireless device.

Example 22 includes the subject matter of Example 21, and optionally, comprising generating an OOK transmit pulse over the plurality of OFDM tones, and modulating a plurality of payload values of the payload by selectively transmitting the OOK transmit pulse during one or more OFDM symbol periods of a plurality of OFDM symbol periods.

Example 23 includes the subject matter of Example 22, and optionally, comprising selecting, based on a payload value, whether or not to transmit the OOK transmit pulse over at least one OFDM symbol period.

Example 24 includes the subject matter of Example 23, and optionally, comprising selecting to transmit the OOK transmit pulse over the OFDM symbol period to indicate an On-state of the OOK modulation scheme, and selecting not to transmit the OOK transmit pulse over the OFDM symbol period to indicate an Off-state of the OOK modulation scheme.

Example 25 includes the subject matter of any one of Examples 21-24, and optionally, comprising selecting the plurality of OFDM tones based on a feedback from the second wireless device.

Example 26 includes the subject matter of any one of Examples 21-25, and optionally, comprising adjusting a modulation of the plurality of OFDM tones based on a feedback from the second wireless device.

Example 27 includes the subject matter of any one of Examples 21-26, and optionally, comprising setting a signal field in the preamble to indicate at least a duration of the payload.

Example 28 includes the subject matter of Example 27, and optionally, comprising setting a rate field and a length field in the signal field based on a number of the plurality of OFDM tones, and a number of OOK bits in the payload.

Example 29 includes the subject matter of any one of Examples 21-28, and optionally, wherein the plurality of OFDM tones comprises 12 OFDM tones.

Example 30 includes a product comprising one or more tangible computer-readable non-transitory storage media comprising computer-executable instructions operable to, when executed by at least one computer processor, enable the at least one computer processor to implement one or more operations at a first wireless device, the operations comprising modulating a preamble of a wakeup packet according to an Orthogonal Frequency Division Multiplexing (OFDM) scheme; modulating a payload of the wakeup packet according to an On-Off keying (OOK) modulation scheme over a plurality of OFDM tones of the OFDM scheme; and transmitting the wakeup packet to a second wireless device.

Example 31 includes the subject matter of Example 30, and optionally, wherein the operations comprise generating an OOK transmit pulse over the plurality of OFDM tones, and modulating a plurality of payload values of the payload by selectively transmitting the OOK transmit pulse during one or more OFDM symbol periods of a plurality of OFDM symbol periods.

Example 32 includes the subject matter of Example 31, and optionally, wherein the operations comprise selecting, based on a payload value, whether or not to transmit the OOK transmit pulse over at least one OFDM symbol period.

Example 33 includes the subject matter of Example 32, and optionally, wherein the operations comprise selecting to transmit the OOK transmit pulse over the OFDM symbol period to indicate an On-state of the OOK modulation scheme, and selecting not to transmit the OOK transmit pulse over the OFDM symbol period to indicate an Off-state of the OOK modulation scheme.

Example 34 includes the subject matter of any one of Examples 30-33, and optionally, wherein the operations comprise selecting the plurality of OFDM tones based on a feedback from the second wireless device.

Example 35 includes the subject matter of any one of Examples 30-34, and optionally, wherein the operations comprise adjusting a modulation of the plurality of OFDM tones based on a feedback from the second wireless device.

Example 36 includes the subject matter of any one of Examples 30-35, and optionally, wherein the operations comprise setting a signal field in the preamble to indicate at least a duration of the payload.

Example 37 includes the subject matter of Example 36, and optionally, wherein the operations comprise setting a rate field and a length field in the signal field based on a number of the plurality of OFDM tones, and a number of OOK bits in the payload.

Example 38 includes the subject matter of any one of Examples 30-37, and optionally, wherein the plurality of OFDM tones comprises 12 OFDM tones.

Example 39 includes an apparatus of wireless communication by a first wireless device, the apparatus comprising means for modulating at the first wireless device a preamble of a wakeup packet according to an Orthogonal Frequency Division Multiplexing (OFDM) scheme; means for modulating a payload of the wakeup packet according to an On-Off keying (OOK) modulation scheme over a plurality of OFDM tones of the OFDM scheme; and means for transmitting the wakeup packet to a second wireless device.

Example 40 includes the subject matter of Example 39, and optionally, comprising means for generating an OOK transmit pulse over the plurality of OFDM tones, and means for modulating a plurality of payload values of the payload by selectively transmitting the OOK transmit pulse during one or more OFDM symbol periods of a plurality of OFDM symbol periods.

Example 41 includes the subject matter of Example 40, and optionally, comprising means for selecting, based on a payload value, whether or not to transmit the OOK transmit pulse over at least one OFDM symbol period.

Example 42 includes the subject matter of Example 41, and optionally, comprising means for selecting to transmit the OOK transmit pulse over the OFDM symbol period to indicate an On-state of the OOK modulation scheme, and selecting not to transmit the OOK transmit pulse over the OFDM symbol period to indicate an Off-state of the OOK modulation scheme.

Example 43 includes the subject matter of any one of Examples 39-42, and optionally, comprising means for selecting the plurality of OFDM tones based on a feedback from the second wireless device.

Example 44 includes the subject matter of any one of Examples 39-43, and optionally, comprising means for adjusting a modulation of the plurality of OFDM tones based on a feedback from the second wireless device.

Example 45 includes the subject matter of any one of Examples 39-44, and optionally, comprising means for setting a signal field in the preamble to indicate at least a duration of the payload.

Example 46 includes the subject matter of Example 45, and optionally, comprising means for setting a rate field and a length field in the signal field based on a number of the plurality of OFDM tones, and a number of OOK bits in the payload.

Example 47 includes the subject matter of any one of Examples 39-46, and optionally, wherein the plurality of OFDM tones comprises 12 OFDM tones.

Example 48 includes an apparatus comprising circuitry configured to cause a first wireless device to demodulate, at a wakeup receiver of the first wireless device, a preamble of a wakeup packet from a second wireless device according to an Orthogonal Frequency Division Multiplexing (OFDM) scheme; demodulate, at the wakeup receiver of the first wireless device, a payload of the wakeup packet according to an On-Off keying (OOK) modulation scheme over a plurality of OFDM tones of the OFDM scheme; and based on the payload of the wakeup packet, activate a transceiver of the first wireless device.

Example 49 includes the subject matter of Example 48, and optionally, wherein the apparatus is configured to cause the first wireless device to demodulate a plurality of payload values of the payload by detecting which OFDM symbol periods of a plurality of OFDM symbol periods include an OOK transmit pulse over the plurality of OFDM tones.

Example 50 includes the subject matter of Example 49, and optionally, wherein the apparatus is configured to cause the first wireless device to determine an On-state of the OOK modulation scheme of a payload value corresponding to at least one OFDM symbol period when the OOK transmit pulse is received during the OFDM symbol period, and to determine an Off-state of the OOK modulation scheme of the payload value corresponding to the OFDM symbol period when the OOK transmit pulse is not received during the OFDM symbol period.

Example 51 includes the subject matter of any one of Examples 48-50, and optionally, wherein the apparatus is configured to cause the first wireless device to transmit to the second wireless device feedback information configured to trigger an adjustment of the OOK modulation scheme over the plurality of OFDM tones.

Example 52 includes the subject matter of Example 51, and optionally, wherein the feedback information comprises at least one attribute selected from the group consisting of a frequency offset of the plurality of OFDM tones, and an interference to the plurality of OFDM tones.

Example 53 includes the subject matter of any one of Examples 48-52, and optionally, wherein the apparatus is configured to cause the first wireless device to determine a length of the payload based on a signal field in the preamble.

Example 54 includes the subject matter of any one of Examples 48-53, and optionally, wherein the plurality of OFDM tones comprises 12 OFDM tones.

Example 55 includes the subject matter of any one of Examples 48-54, and optionally, comprising the wakeup receiver and the transceiver.

Example 56 includes the subject matter of any one of Examples 48-55, and optionally, comprising one or more antennas, and a memory.

Example 57 includes a system of wireless communication comprising a first wireless device, the first wireless device comprising one or more antennas; a memory; a processor; a transceiver; and a wakeup receiver configured to demodulate a preamble of a wakeup packet from a second wireless device according to an Orthogonal Frequency Division Multiplexing (OFDM) scheme, to demodulate a payload of the wakeup packet according to an On-Off keying (OOK) modulation scheme over a plurality of OFDM tones of the OFDM scheme, and based on the payload of the wakeup packet, to activate the transceiver to communicate with the second wireless device.

Example 58 includes the subject matter of Example 57, and optionally, wherein the first wireless device is to demodulate a plurality of payload values of the payload by detecting which OFDM symbol periods of a plurality of OFDM symbol periods include an OOK transmit pulse over the plurality of OFDM tones.

Example 59 includes the subject matter of Example 58, and optionally, wherein the first wireless device is to determine an On-state of the OOK modulation scheme of a payload value corresponding to at least one OFDM symbol period when the OOK transmit pulse is received during the OFDM symbol period, and to determine an Off-state of the OOK modulation scheme of the payload value corresponding to the OFDM symbol period when the OOK transmit pulse is not received during the OFDM symbol period.

Example 60 includes the subject matter of any one of Examples 57-59, and optionally, wherein the first wireless device is to transmit to the second wireless device feedback information configured to trigger an adjustment of the OOK modulation scheme over the plurality of OFDM tones.

Example 61 includes the subject matter of Example 60, and optionally, wherein the feedback information comprises at least one attribute selected from the group consisting of a frequency offset of the plurality of OFDM tones, and an interference to the plurality of OFDM tones.

Example 62 includes the subject matter of any one of Examples 57-61, and optionally, wherein the first wireless device is to determine a length of the payload based on a signal field in the preamble.

Example 63 includes the subject matter of any one of Examples 57-62, and optionally, wherein the plurality of OFDM tones comprises 12 OFDM tones.

Example 64 includes a method to be performed by a first wireless device, the method comprising demodulating, at a wakeup receiver of the first wireless device, a preamble of a wakeup packet from a second wireless device according to an Orthogonal Frequency Division Multiplexing (OFDM) scheme; demodulating, at the wakeup receiver of the first wireless device, a payload of the wakeup packet according to an On-Off keying (OOK) modulation scheme over a plurality of OFDM tones of the OFDM scheme; and based on the payload of the wakeup packet, activating a transceiver of the first wireless device.

Example 65 includes the subject matter of Example 64, and optionally, comprising demodulating a plurality of payload values of the payload by detecting which OFDM symbol periods of a plurality of OFDM symbol periods include an OOK transmit pulse over the plurality of OFDM tones.

Example 66 includes the subject matter of Example 65, and optionally, comprising determining an On-state of the OOK modulation scheme of a payload value corresponding to at least one OFDM symbol period when the OOK transmit pulse is received during the OFDM symbol period, and determining an Off-state of the OOK modulation scheme of the payload value corresponding to the OFDM symbol period when the OOK transmit pulse is not received during the OFDM symbol period.

Example 67 includes the subject matter of any one of Examples 64-66, and optionally, comprising transmitting to the second wireless device feedback information configured to trigger an adjustment of the OOK modulation scheme over the plurality of OFDM tones.

Example 68 includes the subject matter of Example 67, and optionally, wherein the feedback information comprises at least one attribute selected from the group consisting of a frequency offset of the plurality of OFDM tones, and an interference to the plurality of OFDM tones.

Example 69 includes the subject matter of any one of Examples 64-68, and optionally, comprising determining a length of the payload based on a signal field in the preamble.

Example 70 includes the subject matter of any one of Examples 64-69, and optionally, wherein the plurality of OFDM tones comprises 12 OFDM tones.

Example 71 includes a product comprising one or more tangible computer-readable non-transitory storage media comprising computer-executable instructions operable to, when executed by at least one computer processor, enable the at least one computer processor to implement one or more operations at a first wireless device, the operations comprising demodulating, at a wakeup receiver of the first wireless device, a preamble of a wakeup packet from second wireless device according to an Orthogonal Frequency Division Multiplexing (OFDM) scheme; demodulating, at the wakeup receiver of the first wireless device, a payload of the wakeup packet according to an On-Off keying (OOK) modulation scheme over a plurality of OFDM tones of the OFDM scheme; and based on the payload of the wakeup packet, activating a transceiver of the first wireless device.

Example 72 includes the subject matter of Example 71, and optionally, wherein the operations comprise demodulating a plurality of payload values of the payload by detecting which OFDM symbol periods of a plurality of OFDM symbol periods include an OOK transmit pulse over the plurality of OFDM tones.

Example 73 includes the subject matter of Example 72, and optionally, wherein the operations comprise determining an On-state of the OOK modulation scheme of a payload value corresponding to at least one OFDM symbol period when the OOK transmit pulse is received during the OFDM symbol period, and determining an Off-state of the OOK modulation scheme of the payload value corresponding to the OFDM symbol period when the OOK transmit pulse is not received during the OFDM symbol period.

Example 74 includes the subject matter of any one of Examples 71-73, and optionally, wherein the operations comprise transmitting to the second wireless device feedback information configured to trigger an adjustment of the OOK modulation scheme over the plurality of OFDM tones.

Example 75 includes the subject matter of Example 74, and optionally, wherein the feedback information comprises at least one attribute selected from the group consisting of a frequency offset of the plurality of OFDM tones, and an interference to the plurality of OFDM tones.

Example 76 includes the subject matter of any one of Examples 71-75, and optionally, wherein the operations comprise determining a length of the payload based on a signal field in the preamble.

Example 77 includes the subject matter of any one of Examples 71-76, and optionally, wherein the plurality of OFDM tones comprises 12 OFDM tones.

Example 78 includes an apparatus of wireless communication by a first wireless device, the apparatus comprising means for demodulating, at a wakeup receiver of the first wireless device, a preamble of a wakeup packet from second wireless device according to an Orthogonal Frequency Division Multiplexing (OFDM) scheme; means for demodulating, at the wakeup receiver of the first wireless device, a payload of the wakeup packet according to an On-Off keying (OOK) modulation scheme over a plurality of OFDM tones of the OFDM scheme; and means for, based on the payload of the wakeup packet, activating a transceiver of the first wireless device.

Example 79 includes the subject matter of Example 78, and optionally, comprising means for demodulating a plurality of payload values of the payload by detecting which OFDM symbol periods of a plurality of OFDM symbol periods include an OOK transmit pulse over the plurality of OFDM tones.

Example 80 includes the subject matter of Example 79, and optionally, comprising means for determining an On-state of the OOK modulation scheme of a payload value corresponding to at least one OFDM symbol period when the OOK transmit pulse is received during the OFDM symbol period, and determining an Off-state of the OOK modulation scheme of the payload value corresponding to the OFDM symbol period when the OOK transmit pulse is not received during the OFDM symbol period.

Example 81 includes the subject matter of any one of Examples 78-80, and optionally, comprising means for transmitting to the second wireless device feedback information configured to trigger an adjustment of the OOK modulation scheme over the plurality of OFDM tones.

Example 82 includes the subject matter of Example 81, and optionally, wherein the feedback information comprises at least one attribute selected from the group consisting of a frequency offset of the plurality of OFDM tones, and an interference to the plurality of OFDM tones.

Example 83 includes the subject matter of any one of Examples 78-82, and optionally, comprising means for determining a length of the payload based on a signal field in the preamble.

Example 84 includes the subject matter of any one of Examples 78-83, and optionally, wherein the plurality of OFDM tones comprises 12 OFDM tones.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause an Orthogonal Frequency Division Multiplexing (OFDM) transmitter of a first wireless communication device to:
   transmit a preamble of a wakeup packet to a second wireless communication device, the preamble modulated according to an OFDM scheme; and
   transmit a payload of the wakeup packet, the payload modulated according to an On-Off keying (OOK) modulation scheme over a plurality of OFDM tones of the OFDM scheme, the apparatus configured to cause the first wireless communication device to select, based on a payload value of the payload, whether or not to cause the OFDM transmitter to transmit an OOK transmit pulse over the plurality of OFDM tones during at least one OFDM symbol period.

2. The apparatus of claim 1 configured to cause the first wireless communication device to generate the OOK transmit pulse over the plurality of OFDM tones, and to modulate a plurality of payload values of the payload by selectively causing the OFDM transmitter to transmit the OOK transmit pulse during one or more OFDM symbol periods of a plurality of OFDM symbol periods.

3. The apparatus of claim 1 comprising the OFDM transmitter.

4. The apparatus of claim 1 comprising one or more antennas.

5. An apparatus comprising circuitry and logic configured to cause an Orthogonal Frequency Division Multiplexing (OFDM) transmitter of a first wireless communication device to:
transmit a preamble of a wakeup packet to a second wireless communication device, the preamble modulated according to an OFDM scheme; and
transmit a payload of the wakeup packet the payload modulated according to an On-Off keying (OOK) modulation scheme over a plurality of OFDM tones of the OFDM scheme, the apparatus configured to cause the first wireless communication device to modulate an On-state of the OOK modulation scheme by causing the OFDM transmitter to transmit an OOK transmit pulse over the plurality of OFDM tones during at least one OFDM symbol period, and to modulate an Off-state of the OOK modulation scheme by selecting not to cause the OFDM transmitter to transmit the OOK transmit pulse over the plurality of OFDM tones during the OFDM symbol period.

6. The apparatus of claim 5, wherein the preamble comprises a signal field to indicate at least a duration of the payload.

7. An apparatus comprising circuitry and logic configured to cause an Orthogonal Frequency Division Multiplexing (OFDM) transmitter of a first wireless communication device to:
transmit a preamble of a wakeup packet to a second wireless communication device, the preamble modulated according to an OFDM scheme; and
transmit a payload of the wakeup packet, the payload modulated according to an On-Off keying (OOK) modulation scheme over a plurality of OFDM tones of the OFDM scheme, the apparatus configured to cause the first wireless communication device to select the plurality of OFDM tones based on a feedback from the second wireless communication device.

8. The apparatus of claim 7, wherein the plurality of OFDM tones comprises 12 OFDM tones.

9. An apparatus comprising circuitry and logic configured to cause an Orthogonal Frequency Division Multiplexing, (OFDM) transmitter of a first wireless communication device to:
transmit a preamble of a wakeup packet to a second wireless communication device, the preamble modulated according to an OFDM scheme; and
transmit a payload of the wakeup packet, the payload modulated according to an On-Off keying (OOK) modulation scheme over a plurality of OFDM tones of the OFDM scheme, the apparatus configured to cause the first wireless communication device to adjust a modulation of the plurality of OFDM tones based on a feedback from the second wireless communication device.

10. The apparatus of claim 9, wherein the preamble comprises a signal field to indicate at least a duration of the payload.

11. An apparatus comprising circuitry and logic configured to cause an Orthogonal Frequency Division Multiplexing (OFDM) transmitter of a first wireless communication device to:
transmit a preamble of a wakeup packet to a second wireless communication device, the preamble modulated according to an OFDM scheme; and
transmit a payload of the wakeup packet the payload modulated according to an On-Off keying (OOK) modulation scheme over a plurality of OFDM tones of the OFDM scheme, wherein the preamble comprises a rate field and a length field, which are based on a number of the plurality of OFDM tones and a number of OOK bits in the payload.

12. A product comprising one or more tangible computer-readable non-transitory storage media comprising computer-executable instructions operable to, when executed by at least one computer processor, enable the at least one computer processor to:
cause an Orthogonal Frequency Division Multiplexing (OFDM) transmitter of a first wireless communication device to transmit a preamble of a wakeup packet to a second wireless communication device, the preamble modulated according to an OFDM scheme; and
cause the OFDM transmitter to transmit a payload of the wakeup packet, the payload modulated according to an On-Off keying (OOK) modulation scheme over a plurality of OFDM tones of the OFDM scheme, the instructions, when executed, cause the first wireless communication device to select, based on a payload value of the payload, whether or not to cause the OFDM transmitter to transmit an OOK transmit pulse over the plurality of OFDM tones during at least one OFDM symbol period.

13. The product of claim 12, wherein the plurality of OFDM tones comprises 12 OFDM tones.

14. A product comprising one or more tangible computer-readable non-transitory storage media comprising computer-executable instructions operable to, when executed, by at least one computer processor enable the at least one computer processor to:
cause an Orthogonal Frequency Division Multiplexing (OFDM) transmitter of a first wireless communication device to transmit a preamble of a wakeup packet to a second wireless communication device, the preamble modulated according to an OFDM scheme; and
cause the OFDM transmitter to transmit a payload of the wakeup packet, the payload modulated according to an On-Off keying (OOK) modulation scheme over a plurality of OFDM tones of the OFDM scheme, the instructions, when executed, cause the first wireless communication device to:
modulate an On-state of the OOK modulation scheme by causing the OFDM transmitter to transmit an OOK transmit pulse over the plurality of OFDM tones during at least one OFDM symbol period; and
modulate an Off-state of the OOK modulation scheme by selecting not to cause the OFDM transmitter to transmit the OOK transmit pulse over the plurality of OFDM tones during the OFDM symbol period.

15. The product of claim 14, wherein the preamble comprises a signal field to indicate at least a duration of the payload.

16. A product comprising one or more tangible computer-readable non-transitory storage media comprising computer-executable instructions operable to, when executed, by at least one computer processor, enable the at least one computer processor to:
cause an Orthogonal Frequency Division Multiplexing (OFDM) transmitter of a first wireless communication device to transmit a preamble of a wakeup packet to a second wireless communication device, the preamble modulated according to an OFDM scheme; and cause the OFDM transmitter to transmit a payload of the wakeup packet, the payload modulated according to an On-Off keying (OOK) modulation scheme over a plurality of OFDM tones of the OFDM scheme, the instructions, when executed, cause the first wireless communication device to select the plurality of OFDM tones based on a feedback from the second wireless communication device.

17. A product comprising one or more tangible computer-readable non-transitory storage media comprising computer-executable instructions operable to, when executed, by at least one computer processor, enable the at least one computer processor to:

cause an Orthogonal Frequency Division Multiplexing (OFDM) transmitter of a first wireless communication device to transmit a preamble of a wakeup packet to a second wireless communication device the preamble modulated according to an OFDM scheme; and cause the OFDM transmitter to transmit a payload of the wakeup packet, the payload modulated according to an On-Off keying (OOK) modulation scheme over a plurality of OFDM tones of the OFDM scheme, the instructions, when executed, cause the first wireless communication device to adjust a modulation of the plurality of OFDM tones based on a feedback from the second wireless communication device.

18. A product comprising one or more tangible computer-readable non-transitory storage media comprising computer-executable instructions operable to, when executed, by at least one computer processor, enable the at least one computer processor to:

cause an Orthogonal Frequency Division Multiplexing (OFDM) transmitter of a first wireless communication device to transmit a preamble of a wakeup packet to a second wireless communication device, the preamble modulated according to an OFDM scheme; and cause the OFDM transmitter to transmit a payload of the wakeup packet, the payload modulated according to an On-Off keying (OOK) modulation scheme over a plurality of OFDM tones of the OFDM scheme, wherein the preamble comprises a rate field and a length field, which are based on a number of the plurality of OFDM tones and a number of OOK bits in the payload.

19. An apparatus comprising circuitry and logic configured to cause a first wireless communication device to:

detect, at a wakeup receiver of the first wireless communication device, a wakeup packet from a second wireless communication device, a preamble of the wakeup packet from the second wireless communication device modulated according to an Orthogonal Frequency Division Multiplexing (OFDM) scheme;

demodulate, at the wakeup receiver of the first wireless communication device, a payload of the wakeup packet according to an On-Off keying (OOK) modulation scheme over a plurality of OFDM tones of the OFDM scheme, demodulating the payload comprises demodulating a payload value of the payload by determining an OOK On-state of the payload value when an OOK transmit pulse is detected during at least one OFDM symbol period, and determining an OOK Off-state of the payload value when the OOK transmit pulse is not detected during the OFDM symbol period; and based on the payload of the wakeup packet, activate a transceiver of the first wireless communication device.

20. The apparatus of claim 19 comprising the wakeup receiver and the transceiver.

21. An apparatus comprising circuitry and logic configured to cause a first wireless communication device to:

detect, at a wakeup receiver of the first wireless communication device, a wakeup packet from a second wireless communication device, a preamble of the wakeup packet from the second wireless communication device modulated according to an Orthogonal Frequency Division Multiplexing (OFDM) scheme;

demodulate, at the wakeup receiver of the first wireless communication device, a payload of the wakeup packet according to an On-Off keying (OOK) modulation scheme over a plurality of OFDM tones of the OFDM scheme;

based on the payload of the wakeup packet, activate a transceiver of the first wireless communication device; and transmit to the second wireless communication device feedback information to indicate an adjustment of the OOK modulation scheme over the plurality of OFDM tones.

22. The apparatus of claim 21, wherein the plurality of OFDM tones comprises 12 OFDM tones.

23. A product comprising one or more tangible computer-readable non-transitory storage media comprising computer-executable instructions operable to, when executed by at least one computer processor, enable the at least one computer processor to cause a first wireless communication device to:

detect, at a wakeup receiver of the first wireless communication device, a wakeup packet from a second wireless communication device, a preamble of the wakeup packet from the second wireless communication device modulated according to an Orthogonal Frequency Division Multiplexing (OFDM) scheme;

demodulate, at the wakeup receiver of the first wireless communication device, a payload of the wakeup packet according to an On-Off keying (OOK) modulation scheme over a plurality of OFDM tones of the OFDM scheme, demodulating the payload comprises demodulating a payload value of the payload by determining an OOK On-state of the payload value when an OOK transmit pulse is detected during at least one OFDM symbol period, and determining an OOK Off-state of the payload value when the OOK transmit pulse is not detected during the OFDM symbol period; and based on the payload of the wakeup packet, activate a transceiver of the first wireless communication device.

24. The product of claim 23, wherein the instructions, when executed, cause the first wireless communication device to transmit to the second wireless communication device feedback information to indicate an adjustment of the OOK modulation scheme over the plurality of OFDM tones.

* * * * *

UNITED STATES PATENT AND TRADEMARK OFFICE
CERTIFICATE OF CORRECTION

PATENT NO. : 9,848,385 B2
APPLICATION NO. : 15/272827
DATED : December 19, 2017
INVENTOR(S) : Minyoung Park et al.

It is certified that error appears in the above-identified patent and that said Letters Patent is hereby corrected as shown below:

In the Claims

In Column 29, Line 14, in Claim 5, delete "transmit a payload of the wakeup packet the payload" and insert -- transmit a payload of the wakeup packet, the payload --, therefor.

In Column 30, Line 4, in Claim 11, delete "transmit a payload of the wakeup packet the payload" and insert -- transmit a payload of the wakeup packet, the payload --, therefor.

In Column 30, Line 36, in Claim 14, delete "one computer processor enable" and insert -- one computer processor, enable --, therefor.

Signed and Sealed this
Third Day of July, 2018

Andrei Iancu
*Director of the United States Patent and Trademark Office*